United States Patent
Kamiya et al.

(10) Patent No.: US 7,134,638 B2
(45) Date of Patent: Nov. 14, 2006

(54) STOP VALVE FOR GAS TANK

(75) Inventors: Tadayoshi Kamiya, Okazaki (JP);
Soichi Shirai, Toyohashi (JP);
Nobuyuki Shirai, Toyohashi (JP);
Toshihiko Shima, Okazaki (JP);
Hiroaki Suzuki, Nagoya (JP);
Yoshiyuki Takeuchi, Gamagori (JP)

(73) Assignees: Toyooki Kogyo Co., Ltd., Okazaki (JP); Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 11/041,060

(22) Filed: Jan. 21, 2005

(65) Prior Publication Data

US 2005/0161627 A1     Jul. 28, 2005

(30) Foreign Application Priority Data

Jan. 28, 2004    (JP)    ............................. 2004-020339

(51) Int. Cl.
*F16K 31/44*    (2006.01)
(52) U.S. Cl. ....................................... 251/83; 251/144
(58) Field of Classification Search ................ 251/144, 251/264, 275, 276, 83
See application file for complete search history.

(56) References Cited

U.S. PATENT DOCUMENTS

| | | | |
|---|---|---|---|
| 3,292,895 A | 12/1966 | Leger et al. | |
| 3,305,207 A | 2/1967 | Calderoni et al. | |
| 3,761,053 A | 9/1973 | Bedo et al. | |
| 4,402,340 A | 9/1983 | Lockwood, Jr. | |
| 5,074,523 A * | 12/1991 | Rumbol | ...................... 251/144 |
| 5,725,198 A | 3/1998 | Jandl et al. | |
| 5,937,895 A | 8/1999 | Le Febre et al. | |
| 6,453,933 B1 | 9/2002 | Oi et al. | |
| 6,520,479 B1 * | 2/2003 | Sato | ...................... 251/129.06 |
| 2003/0150497 A1 | 8/2003 | Rousselin | |

FOREIGN PATENT DOCUMENTS

| | | |
|---|---|---|
| JP | 09-210296 | 8/1997 |
| JP | 2001-050196 | 2/2001 |

* cited by examiner

*Primary Examiner*—Edward K. Look
*Assistant Examiner*—John K. Fristoe, Jr.
(74) *Attorney, Agent, or Firm*—Davis & Bujold, P.L.L.C.

(57) ABSTRACT

A stop valve for a gas tank is provided which achieves favorable sealing performance by inhibiting rotation of a sealing member attached to a valve element. A passage is formed inside a valve body, and a valve seat is provided in the passage. The valve element which is engaged and disengaged from the valve seat is slidably inserted to a sliding hole bored in the valve body. The annular sealing member is arranged in sliding contact with the outer peripheral surface of the valve element and the inner peripheral surface of the sliding hole. A screw hole connecting to the sliding hole and coaxial thereto is provided in the valve body. A rotating operation member having a male screw is rotatably screwed into the screw hole from the outside of the valve body. One end of the rotating operation member is made to abut the valve body.

10 Claims, 3 Drawing Sheets

STOP VALVE FOR GAS TANK

This application claims priority from Japanese application serial no. 2004-20339 filed Jan. 28, 2004.

FIELD OF THE INVENTION

This invention relates to a stop valve which opens and closes a passage connecting to a high-pressure gas tank. More particularly, this invention concerns a stop valve which is suitable for opening and closing a passage connecting a high-pressure hydrogen gas tank of a fuel cell vehicle with a fuel cell or a passage connecting a gas tank with a gas supply port.

BACKGROUND OF THE INVENTION

Heretofore, a stop valve has been provided in a passage connecting to a high-pressure gas tank. Unexamined Japanese Patent Publication No. 9-210296 discloses an example of such a stop valve in which a male screw thread formed on a valve element is threadably screwed into a female screw thread formed inside a valve body. The valve element is exposed to the outside of the valve body and can be manually operated by a driving tool from the outside (i.e., external to the valve body). The valve element is driven back and forth in an axial direction by a rotating operation of the valve element. In addition to the movement, the rotating operation causes the valve element to be attached to and detached from a valve seat provided within a passage, thus opening and closing the passage. In order to prevent a leak of high-pressure gas, an annular sealing member, such as an O-ring made from an elastic material, is provided on the outer circumferential surface of the valve element. The sealing member is arranged to be brought into sliding contact with the inner circumferential surface of a cylindrical shape located at a non-threaded portion inside the valve body.

In recent years, further increases in gas filling pressures, for example from 35 MPa to 70 MPa, have been desired when filling high-pressure hydrogen gas into the gas tank of a fuel cell vehicle. However, in the aforementioned conventional stop valve, the valve element is rotated clockwise and counterclockwise by the rotation caused by the male screw being threadably screwed into and out of the female screw thread inside of the valve body. Along with the rotation of the valve element, the sealing member is also rotated clockwise and counterclockwise in the same manner. Accordingly, sealing performance of the sealing member is deteriorated due to the distortion resulting from the rotation. In the case that the gas filling pressure is set to a higher level than before, there is a fear that a leak of hydrogen gas may occur.

SUMMARY OF THE INVENTION

One object of the present invention is to provide a stop valve for a gas tank which inhibits the rotation of a sealing member. Consequently, favorable sealing performance can be achieved even in the case of filling higher-pressure gas into a gas tank.

To attain this and other objects, the present invention provides a stop valve that opens and closes a passage connected to a high-pressure gas tank. The passage is formed inside of a valve body and a valve seat is formed in the passage. A valve element, which is capable of sliding in an axial direction of the valve body and can be attached to and detached from the valve seat, is fitted in a sliding hole bored within the valve body. An annular sealing member, which prevents a leak of high-pressure gas, is arranged to be brought into sliding contact with the outer circumferential surface of the valve element and the inner circumferential surface of the sliding hole. A screw hole having a female screw thread on the inner circumferential surface is formed continuous to the sliding hole within the valve body. A rotating operation member having a corresponding male screw thread cut thereon so as to be threadably screwed into the female screw thread, is rotatably fitted to the screw hole from the outside of the valve body. One end of the rotating operation member is made to abut upon the valve element.

According to the stop valve constituted as above, the valve element which abuts the rotating operation member slides back and forth in an axial direction corresponding to the rotational movement of the rotating operation member. During this time, the valve element is attached to and detached from the valve seat without the significant rotation of the valve element. Thus, the sealing member does not rotate. Distortion due to rotation does not occur to the sealing member and deterioration in sealing performance can be inhibited or prevented. A leak is prevented and thus favorable sealing performance can be achieved even if the pressure of the high-pressure gas filled in the gas tank is set at a much higher level.

The screw hole may be provided coaxially with the sliding hole. The rotating operation member may abut the valve element by a point contact at the center of the axis of the rotating operation member. Then, friction between the valve element and the rotating operation member can be substantially reduced. Since the valve element hardly rotates, distortion of the sealing member can be more reliably inhibited.

An urging member may be provided so that the valve element is urged away from the valve seat and abuts one end of the rotating operation member. As a result, the valve element and the rotating operation member are typically abutted together at all times. This constitution inhibits possible collision of the valve element with the rotating operation member due to the force of the high-pressure gas while the valve element is positioned away from the valve seat. Furthermore, damage which may occur to the male screw thread and the female screw thread by the impact of such a collision can be effectively inhibited.

The valve element may be made from SUS316L (Japan Industrial Standard), a material resistant to hydrogen embrittlement. The valve element having the sealing member and the rotating operation member are separately formed. Therefore, in the case of using hydrogen gas as a high-pressure gas, the valve element, which is brought into contact with hydrogen gas, can be made from SUS316L while the rotating operation member can be made from a high-strength material. It is unnecessary to significantly consider the influence of hydrogen embrittlement upon the rotating operation member since the rotating operation member is not brought into direct contact with the hydrogen gas. Moreover, strengthening of the male screw can be achieved through the use of the high-strength material.

BRIEF DESCRIPTION OF THE DRAWING FIGURES

The invention will now be described, by way of example, with reference to the accompanying drawings, in which.

DETAILED DESCRIPTION OF THE INVENTION

Figure 1:
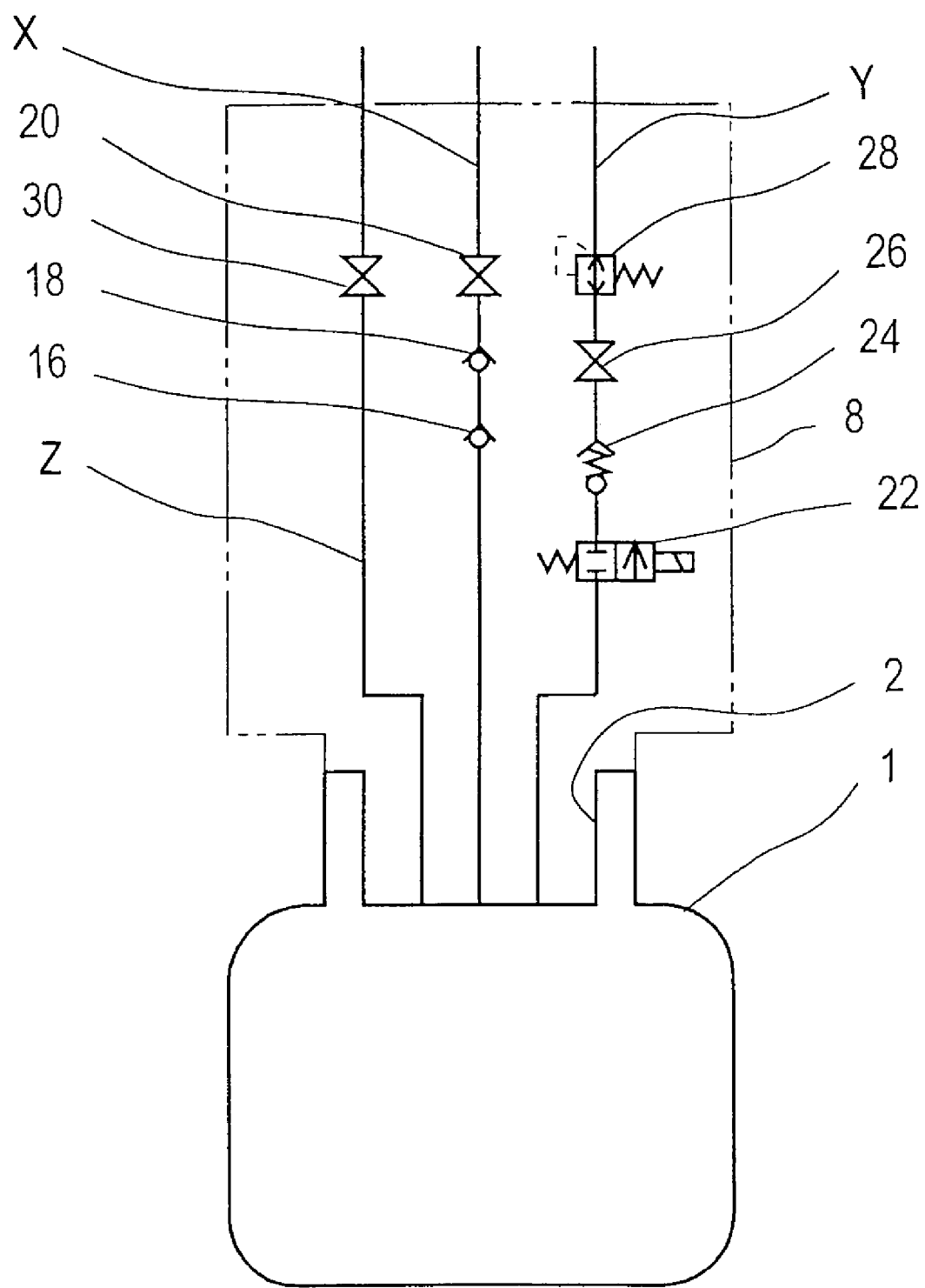
FIG. 1 is a circuit diagram of a gas tank apparatus provided with stop valves according to first and second embodiments of the present invention.
Figure 3:
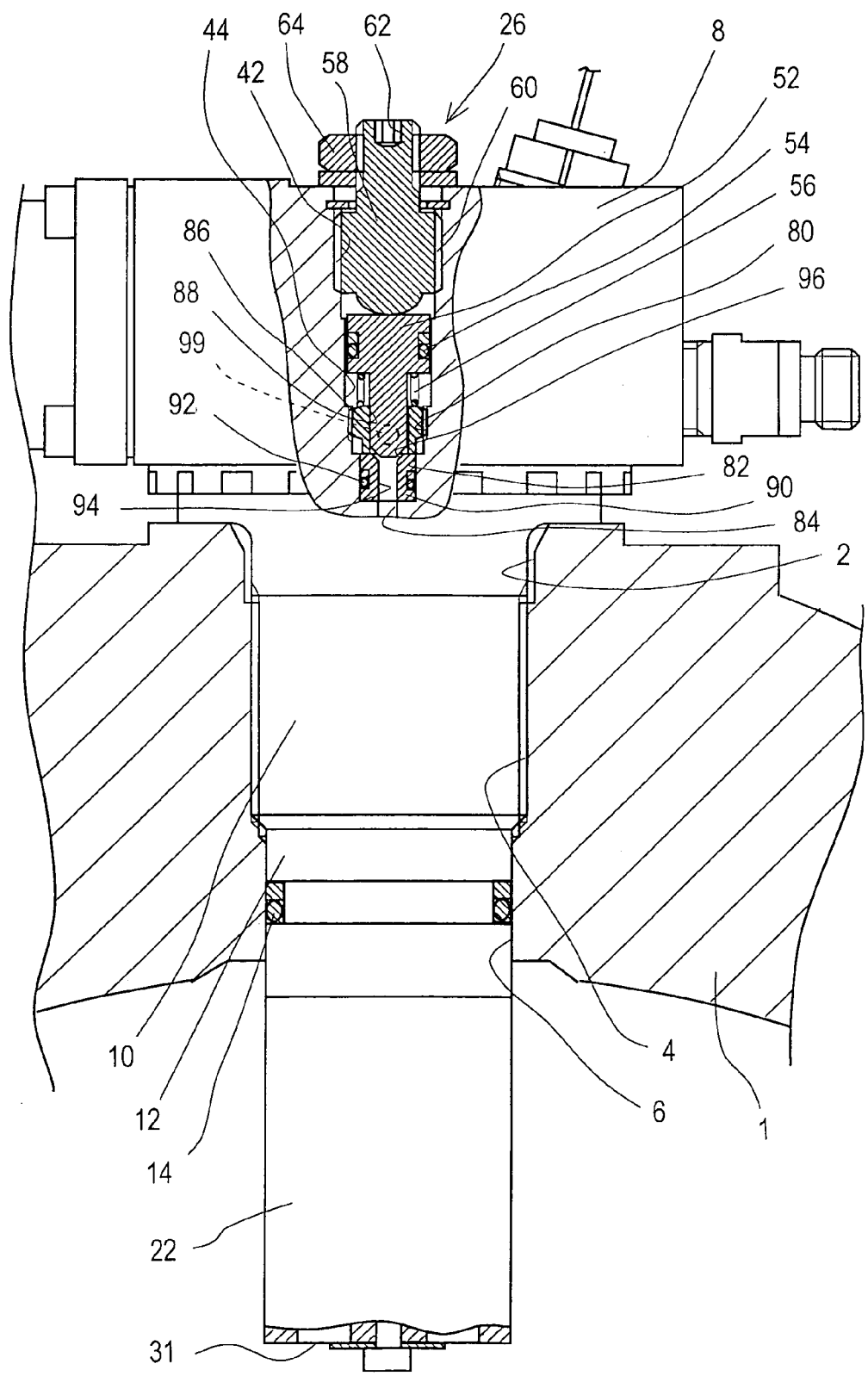
FIG. 3 is a partial cross-sectional view of the gas tank apparatus as seen from a direction indicated by an arrow W in FIG. 2, showing a cross-section of a stop valve according to the second embodiment of the present invention.

Referring to FIGS. 1 and 3, a gas tank 1 of a first embodiment is for filling with high-pressure hydrogen gas. An opening hole 2, formed in the gas tank 1, is a through-hole connecting the inside and outside of the gas tank 1. The opening hole 2 is provided with a female screw thread 4 (see FIG. 3). Also, a straight hole portion 6 is provided continuous to the female screw thread 4.

A valve body 8 is inserted into the gas tank 1 through the opening hole 2. A male screw 10, to be threadably screwed into the corresponding female screw thread 4, is formed on the valve body 8. A straight shaft portion 12, to be fitted into the straight hole portion 6, is also formed on the valve body 8. An O-ring 14, for preventing leaks, is also fitted to the straight shaft portion 12.

As shown in FIG. 1, the valve body 8 is provided with three passages: a passage X for filling hydrogen gas into the gas tank 1; a passage Y for supplying hydrogen gas to any external gas supply port; and an exhaust passage Z for discharging hydrogen gas from the gas tank 1. The passage X is provided with check valves 16 and 18, and a stop valve 20 that is always open. The passage Y is provided with an electromagnetic opening/closing valve 22, an excess flow preventing valve 24, a stop valve 26 that is always open, and a pressure reducing valve 28. The exhaust passage Z is provided with an opening/closing valve 30 that is always closed. In the present embodiment, the electromagnetic opening/closing valve 22 is attached at the end of the straight shaft portion 12. The electromagnetic opening/closing valve 22 is formed to have nearly the same outer configuration as the straight shaft portion 12. The electromagnetic opening/closing valve 22 is inserted into the gas tank 1. An opening 31 into the gas tank 1, of the passage Y, is provided at an axial end of the electromagnetic opening/closing valve 22.

Figure 2:
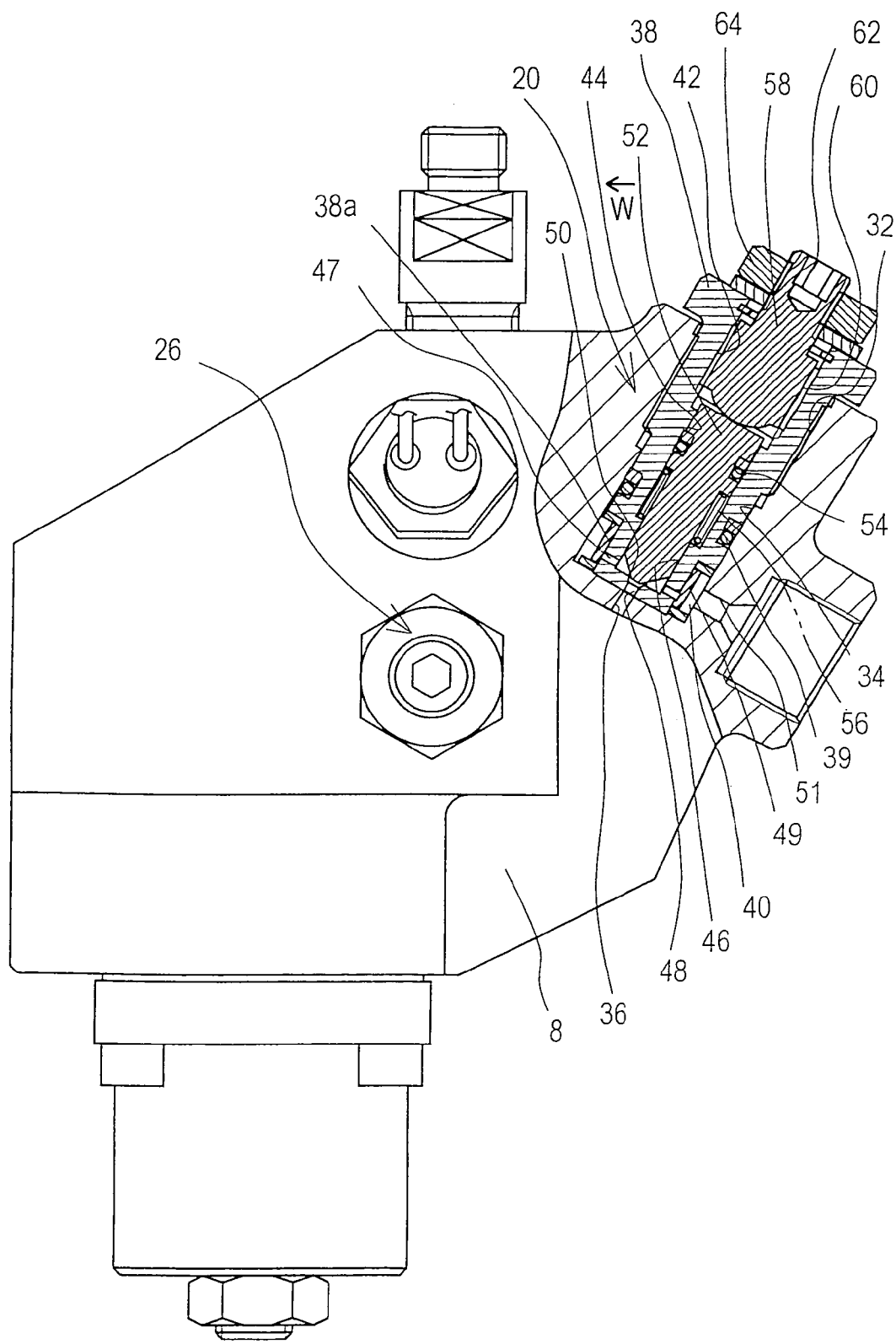
FIG. 2 is a plan view of a gas tank apparatus showing a cross-section of the stop valve according to the first embodiment of the present invention.

As can be seen from FIG. 2, according to the first embodiment, the stop valve 20 is integrally formed with the valve body 8. A screw hole 32, an insertion hole 34 that is formed adjacent to the screw hole 32 and coaxial thereto, and a communication hole 36 connected to the insertion hole 34, are formed in sequence in the valve body 8 towards the inside thereof. An attachment member 38 is threadably screwed into the screw hole 32 and inserted into the insertion hole 34. An O-ring 39 is attached to the attachment member 38 and functions for leak prevention. A small diameter portion 38a is provided at a tip of the attachment member 38, and together with the insertion hole 34, creates an annular chamber 40. In the present embodiment, the attachment member 38 is threadably screwed into the valve body 8 as a separate component of the valve body 8. However, the attachment member 38 and the valve body 8 may be integrally formed to constitute a single valve body.

A screw hole 42 having a female screw thread is formed in the attachment member 38 in the axial direction. Also, a sliding hole 44 is coaxially formed and connects to the screw hole 42. Furthermore, a small diameter hole 46 is formed continuous with the sliding hole 44. A connection hole 48 is provided to connect the small diameter hole 46 with the communication hole 36. The small diameter hole 46 and the annular chamber 40 are connected via a through hole 47. An annular filter 49 is fitted to the outer circumferential surface of the small diameter portion 38a and arranged within the annular chamber 40.

A valve seat 50 is provided between the small diameter hole 46 and the connection hole 48. A connection hole 51 is formed in the valve body 8 and is connected to the annular chamber 40. In the present embodiment, the communication hole 36, connection hole 48, small diameter hole 46, through hole 47, annular chamber 40, and connection hole 51 constitute a part of the passage X.

A valve element 52 is slidably inserted into the sliding hole 44. An annular sealing member 54 is made of an elastic material and is fitted to the outer periphery of the valve element 52. In the present embodiment, the valve element 52 is made from SUS316L (Japan Industrial Standard JIS G 4303-1998). SUS316L is an austenitic stainless steel material containing 16–18% of Cr, 12–15% of Ni, and 0.03% or less of C. SUS316L is resistant to hydrogen embrittlement and is superior in corrosion resistance.

An O-ring is used as the sealing member 54 in the present embodiment. The sealing member 54 is brought into sliding contact with the inner peripheral surface of the sliding hole 44. The sealing member 54 functions so as to prevent a leak of high-pressure gas from between the outer peripheral surface of the valve element 52 and the inner peripheral surface of the sliding hole 44. The sealing member 54 may also be fitted to the inner peripheral surface of the sliding hole 44 so as to be brought into sliding contact with the outer peripheral surface of the valve element 52. The valve element 52 is designed to engage the valve seat 50 when driven towards the valve seat 50 within the sliding hole 44. The valve element 52 is urged away from the valve seat 50 by an urging member 56, such as a spring, which is stored within the sliding hole 44.

A male screw 60 of a rotating operation member 58 is threadably screwed into the screw hole 42. One end of the rotating operation member 58, a specifically the end inserted into the attachment member 38, protrudes hemispherically. The valve element 52 is designed to slide away from the valve seat 50 due to the urging force of the urging member 56. Consequently, one end of the rotating operation member 58 is brought into a point-contact with an end of the valve element 52 at the center of the end as defined by a central axis. The other end of the rotating operation member 58 protrudes outside of the attachment member 38 and is exposed to the outside of the valve body 8. A rotating operation portion 62 has the shape of a hexagonal hole and is formed at the other end of the rotating operation member 58. A lock nut 64 is also threadably screwed or fastened to the rotating operation member 58. In the present embodiment, the rotating operation member 58 is made from a chrome molybdenum steel (SCM435: Japan Industrial Standard JIS G 4105-1979) material.

From this point forward, operation of the stop valve 20 will be explained.

Firstly, the lock nut 64 is loosened or removed. A hexagonal wrench is inserted in order to the rotating operation portion 62 to rotate the rotating operation member 58. As a result, the male screw 60 is threadably screwed into the screw hole 42 and the rotating operation member 58 is moved in an axial direction.

When the rotating operation member 58 is moved into the screw hole 42, one end of the rotating operation member 58 is brought into a point-contact with the valve element 52 so as to axially slide the valve element 52 into the sliding hole 44. As a result, the valve element 52 is engaged with the valve seat 50 and interrupts the connection between the communication hole 36 and the connection hole 51. Thus, the passage X is shut off.

On the other hand, when the rotating operation member 58 is driven to exit (i.e., back out) from the screw hole 42, the valve element 52 is disengaged from the valve seat 50 due to the force of the urging member 56. As a result, the valve element 52 slides away from the valve seat 50, together with the movement of the rotating operation member 58, while maintaining a point contact state with one end of the rotating operation member 58. The communication hole 36 and the connection hole 51 are connected together so that high-pressure hydrogen gas can pass through the passage X in order to fill the gas tank 1.

The rotating operation member 58 moves clockwise and counterclockwise while being rotated by the rotating operation of the rotating operation portion 62. Together with the rotational movement of the rotating operation member 58, the valve element 52 contacts the rotating operation member 58 and slides in an axial direction without being substantially rotated, and the valve element 52 is engaged and disengaged from the valve seat 50. The sealing member 54 slides in an axial direction without being substantially rotated with the valve element 52.

Accordingly, distortion of the sealing member 54 does not occur by rotation. Sealing performance of the sealing member 54 is not deteriorated due to rotation. Even if a higher-pressure gas is filled in the gas tank 1, it is possible to prevent a leak and achieve a favorable sealing performance. Moreover, the valve element 52, having the sealing member 54, is formed independent of the rotating operation member 58. Therefore, in the case of using hydrogen gas, it is possible to form the valve element 52 and the rotating operation member 58 from different materials. The valve element 52, which directly contacts hydrogen gas may be formed, from a material resistant to hydrogen embrittlement (e.g., SUS316L). The rotating operation member 58, which does not directly contact hydrogen gas, may be formed from a high-strength material (e.g., chrome molybdenum steel (SCM435)). No additional significant consideration concerning the influence of hydrogen is necessary. Strengthening of the male screw 60 can be achieved as well.

Also, the screw hole 42 and the sliding hole 44 are provided coaxially to one another. The valve element 52 and the rotating operation member 58 are abutted together by a point contact at the center axis of the rotating operation member 58. Thus, rotational friction is reduced between the valve element 52 and the rotating operation member 58. The potential rotation of the valve element 52 is further minimized. Consequently, rotational distortion of the sealing member 54 is reliably inhibited.

Moreover, the urging member 56 is provided so that the valve element 52 is urged away from the valve seat 50 and relatively consistently abuts one end of the rotating operation member 58. Therefore, the valve element 52 and the rotating operation member 58 are typically abutted together at all times. As a result, possible collisions between the valve element 52 and the rotating operation member 58 due to high-pressure gas can be prevented while the valve element 52 is disengaged from the valve seat 50. Deterioration of the male screw 60 and the screw hole 42 by an impact due to such collisions can be effectively prevented as well.

Now, a stop valve 26 corresponding to a second embodiment is described by way of FIG. 3. The same reference numbers are given to components identical to those of the stop valve 20 of the previous embodiment. Accordingly, detailed descriptions of those components are not repeated.

In the second embodiment, the screw hole 42 and the sliding hole 44 are directly formed in the valve body 8. A small female screw thread 80, a small diameter hole 82, and a communication hole 84 are formed continuous with the sliding hole 44. A guiding member 86 is threadably fastened to the small female screw thread 80. A through hole 88 is formed in the guiding member 86 in an axial direction. The valve element 52 is slidably inserted into the through hole 88.

An attachment member 90 is inserted into the small diameter hole 82. An O-ring 92 is fitted to the attachment member 90 in order to prevent a leak. A communication hole 94 is formed in the attachment member 90 in an axial direction. The through hole 88 and the communication hole 94 are connected via a valve seat 96 provided on the attachment member 90. The through hole 88 is connected to a connection hole 99 provided in the attachment member 90. In the second embodiment, the attachment member 90 is fitted into the valve body 8 and fixed thereto by the guiding member 86. That is, the attachment member 90 is designed to be a component of the valve body 8. However, the valve body 8 and the attachment member 90 may be designed together to constitute a single valve body.

In the second embodiment as in the first, the lock nut 64 is loosened or removed. A hexagonal wrench is inserted into the rotating operation portion 62 in order to rotate the rotating operation member 58. Thereby, the male screw 60 is threadably screwed into the screw hole 42 and the rotating operation member 58 is moved in an axial direction. When the rotating operation member 58 is moved into the screw hole 42, one end of the rotating operation member 58 is brought into a point contact with the valve element 52, causing the valve element 52 to axially slide into the sliding hole 44. As a result, the valve element 52 is engaged with the valve seat 96 and interrupts the connection between the through hole 88 and the communication hole 94.

On the other hand, when the rotating operation member 58 is driven out from the screw hole 42, the valve element 52 is disengaged from the valve seat 96 due to the force of the urging member 56. Consequently, the valve element 52 slides away from the valve seat 96, together with the movement of the rotating operation member 58, while maintaining a point contact state with one end of the rotating operation member 58. The through hole 88 and the communication hole 94 are connected together so that high-pressure hydrogen gas can pass through the passage Y in order to be supplied to some external gas supply port.

Even in the second embodiment, as above, when the rotating operation member 58 is rotated, the valve element 52 does not significantly rotate but instead only slides in an axial direction. Thus, the sealing member 54 is not significantly twisted due to rotation. Furthermore, the valve element 52 and the rotating operation member 58 are separately configured. Therefore, the valve element 52 and the rotating operation member 58 can be formed from different materials.

Moreover, the rotating operation member 58 is in a point contact with the valve element 52. Accordingly, rotational friction therebetween can be reduced. In addition, since the urging member 56 is provided, the valve element 52 and the rotating operation member 58 are typically abutted together at all times. Possible collisions due to the force of the high pressure gas can be prevented between the valve element 52 and the rotating operation member 58.

The present invention is not limited to the above embodiments. Other modifications and variations are possible without departing from the scope of the present invention.

For instance, the stop valve of the present invention can be located at any position in a passage connecting to a gas tank.

What is claimed is:

1. A stop valve that opens and closes a passage connected to a high-pressure gas tank, the stop valve comprising:
    a valve body comprising
        the passage including a valve seat formed within the passage; and
        a female threaded portion including a central axis formed coincident to
        a central axis of a sliding hole portion;
    a valve element comprising an annular sealing member;
    a rotating operation member comprising a male threaded portion; and
    an urging member;
    wherein the valve element slidably interacts with the sliding hole portion of the valve body so as to engage and disengage an end of the valve element with the valve seat and correspondingly close and open the passage;
    the annular sealing member slidably seals an outer circumferential surface of the valve element and an inner circumferential surface of the sliding hole portion of the valve body;
    the male threaded portion of the rotating operation member is threadably fastened to the corresponding female threaded portion of the valve body;
    the urging member biases the valve element away from the valve seat and causes contact between the rotating operation member and the valve element;
    the rotating operation member has an axis of rotation substantially coincident to a longitudinal centerline of the valve element;
    one end of the rotating operation member abuts on an other end of the valve element opposite to the end of the valve element opposing the valve seat at a point of contact centered about the axis of rotation of the rotating operation member;
    rotation of the rotating operation member causes the valve element to slidably interact with the sliding hole portion of the valve body;
    the one end of the rotating operation member directly opposing the valve element is in a substantially hemispherical shape; and
    the other end of the valve element directly opposing the rotating operation member is substantially planar.

2. The stop valve according to claim 1 whereby the valve element is made from SUS316L.

3. The stop valve according to claim 1, whereby the rotating operation member is locked in a desired rotation position by a locking nut.

4. The stop valve according to claim 1, whereby the urging member is a spring.

5. The stop valve according to claim 1, whereby the annular sealing member is an O-ring; and
    the annular sealing member is attached to the valve element and slidably engages the inner circumferential surface of the sliding hole portion of the valve body.

6. A stop valve that opens and closes a passage connected to a high-pressure gas tank, the stop valve comprising:
    a valve body comprising
        the passage including a valve seat formed within the passage; and
        a female threaded portion including a central axis formed coincident to a
        central axis of a sliding hole portion;
    a valve element comprising an annular sealing member;
    a rotating operation member comprising a male threaded portion; and
    an urging member;
    wherein the valve element slidably interacts with the sliding hole portion of the valve body so as to engage and disengage an end of the valve element with the valve seat and correspondingly close and open the passage;
    the annular sealing member slidably seals an outer circumferential surface of the valve element and an inner circumferential surface of the sliding hole portion of the valve body;
    the male threaded portion of the rotating operation member is threadably fastened to the corresponding female threaded portion of the valve body;
    the urging member biases the valve element away from the valve seat and causes contact between the rotating operation member and the valve element;
    the rotating operation member has an axis of rotation substantially coincident to a longitudinal centerline of valve element;
    one end of the rotating operation member abuts on an other end of the valve element opposite to the end of the valve element opposing the valve seat at a point of contact centered about the axis of rotation of the rotating operation member;
    rotation of the rotating operation member causes the valve element to slidably interact with the sliding hole portion of the valve body;
    the one end of the rotating operation member directly opposing the valve element is substantially planar; and
    the other end of the valve element directly opposing the rotating operation member is substantially hemispherical in shape.

7. The stop valve according to claim 6, whereby the rotating operation member is locked in a desired rotation position by a locking nut.

8. The stop valve according to claim 6, whereby the valve element is made from SUS316L.

9. The stop valve according to claim 6, whereby the urging member is a spring.

10. The stop valve according to claim 6, whereby the annular sealing member is an O-ring; and
    the annular sealing member is attached to the valve element and slidably engages the inner circumferential surface of the sliding hole portion of the valve body.

* * * * *